(12) United States Patent
Waehner et al.

(10) Patent No.: US 7,305,108 B2
(45) Date of Patent: Dec. 4, 2007

(54) SECURITY IDENTIFICATION SYSTEM

(75) Inventors: Glenn C. Waehner, Fresno, CA (US); Peter Kalocsai, Fresno, CA (US)

(73) Assignee: Pelco, Clovis, CA (US)

( * ) Notice: Subject to any disclaimer, the term of this patent is extended or adjusted under 35 U.S.C. 154(b) by 0 days.

(21) Appl. No.: 11/598,547

(22) Filed: Nov. 13, 2006

(65) Prior Publication Data

US 2007/0133844 A1   Jun. 14, 2007

Related U.S. Application Data (63) Continuation-in-part of application No. 10/281,014, filed on Oct. 25, 2002, now Pat. No. 7,136,513.

(60) Provisional application No. 60/354,139, filed on Feb. 4, 2002, provisional application No. 60/338,180, filed on Nov. 8, 2001.

(51) Int. Cl.
*G06K 9/00* (2006.01)

(52) U.S. Cl. .................... 382/118; 340/5.53

(58) Field of Classification Search ............... 382/115, 382/118, 151, 181, 209, 218, 224, 236, 260; 340/5.53, 5.83, 521, 573.1; 713/182, 186
See application file for complete search history.

(56) References Cited

U.S. PATENT DOCUMENTS

| | | |
|---|---|---|
| 3,690,233 A | 9/1972 | Billingsley |
| 3,805,238 A | 4/1974 | Rothfjell |
| 4,458,266 A | 7/1984 | Mahoney |
| 4,814,869 A | 3/1989 | Oliver, Jr. |
| 4,821,118 A | 4/1989 | Lafreniere |
| 4,858,000 A | 8/1989 | Lu |
| 4,975,969 A | 12/1990 | Tal |
| 5,001,755 A | 3/1991 | Skret |
| D325,212 S | 4/1992 | Elberbaum |
| 5,111,288 A | 5/1992 | Blackshear |
| 5,161,107 A | 11/1992 | Mayeaux et al. |
| 5,163,094 A | 11/1992 | Prokoski et al. |
| D349,714 S | 8/1994 | Hasegawa |
| 5,497,430 A * | 3/1996 | Sadovnik et al. ........... 382/156 |

(Continued)

OTHER PUBLICATIONS

Sukthankar, et al. "Argus: The Digital Doorman", IEEE, pp. 14-19, Apr. 2001.*

(Continued)

*Primary Examiner*—Daniel Mariam
(74) *Attorney, Agent, or Firm*—Paul T. Kashimba, Esq.

(57) ABSTRACT

This is a security and identification system designed to obtain improved images for use by real-time facial recognition and identification systems for screening individuals passing through secure entry or checkpoints such as airport passenger terminals, government offices, and other secure locations. The system detects the presence of a subject at the checkpoint, interactively instructs the subject to stop and move into position for proper identification and recognition, analyzes the facial features of the subject as (s)he passes through the checkpoint, and compares the features of the subject with those in a database. The system then generates different signals depending upon whether or not the subject is recognized. In one aspect of the invention, different methods and apparatus are provided for compensating for low ambient light so as to improve the quality of the facial image of the subject that is obtained.

8 Claims, 6 Drawing Sheets

U.S. PATENT DOCUMENTS

| | | | |
|---|---|---|---|
| 5,517,236 A | | 5/1996 | Sergeant et al. |
| 5,561,718 A | * | 10/1996 | Trew et al. .................. 382/118 |
| 5,625,410 A | | 4/1997 | Washino et al. |
| 5,657,076 A | | 8/1997 | Tapp |
| D388,450 S | | 12/1997 | Hamano et al. |
| 5,805,279 A | | 9/1998 | Palombo et al. |
| 5,808,670 A | | 9/1998 | Oyashiki et al. |
| 5,905,807 A | | 5/1999 | Kado et al. |
| 5,923,364 A | | 7/1999 | Rhodes et al. |
| 5,936,610 A | | 8/1999 | Endo |
| D415,509 S | | 10/1999 | Hiraguchi |
| 5,991,429 A | | 11/1999 | Coffin et al. |
| 6,069,653 A | | 5/2000 | Hudson |
| 6,069,655 A | | 5/2000 | Seeley et al. |
| 6,091,771 A | | 7/2000 | Seeley et al. |
| 6,108,035 A | | 8/2000 | Parker et al. |
| 6,108,437 A | | 8/2000 | Lin |
| 6,111,517 A | | 8/2000 | Atick et al. |
| 6,119,096 A | | 9/2000 | Mann et al. |
| 6,130,707 A | | 10/2000 | Koller et al. |
| 6,292,575 B1 | | 9/2001 | Bortolussi et al. |
| 6,305,818 B1 | | 10/2001 | Lebens et al. |
| 6,354,749 B1 | | 3/2002 | Pfaffenberger, II |
| 6,525,663 B2 | | 2/2003 | Colmenarez et al. |
| 6,792,136 B1 | * | 9/2004 | Niesen ...................... 382/118 |
| 6,801,640 B1 | | 10/2004 | Okubo et al. |
| 6,810,135 B1 | | 10/2004 | Berenz et al. |
| 6,812,466 B2 | | 11/2004 | O'connor et al. |
| 6,882,741 B2 | | 4/2005 | Dobashi et al. |
| 7,206,435 B2 | | 4/2007 | Fujimura et al. |

OTHER PUBLICATIONS

DX9000 PLUS with PelcoMATCH Facial Recognition System Brochure, Nov. 2001 (4 pages).

Hiroki Mura, et al., A 100 Frame/s CMOS Active Pixel Sensor for 3D-Gesture Recognition System 1999 IEEE International Solid-State Circuits Conference (pp. 142-143).

Yang Ni, et al., Active Differential CMOS Imaging Device for Human Face Recognition, IEEE Signal Processing Letters, vol. 13, No. 4, Apr. 2006 (pp. 220-223).

Yang Ni and Yan, Xie-Long, CMOS Active Differential Imaging Device with Single In-pixel Analog Memory, Institut National des Telecommunications (ESSCIRC 2002) (pp. 359-362).

Morimoto, Carlos H. and Flickner, Myron, Real-Time Multiple Face Detection Using Active Illumination, 2000 Fourth IEEE International Conference (pp. 8-13).

* cited by examiner

SECURITY IDENTIFICATION SYSTEM

CROSS-REFERENCE TO RELATED APPLICATION

This application claims benefit of U.S. Provisional Application No. 60/338,180 filed Nov. 8, 2001, and U.S. Provisional Application No. 60/354,139 filed Feb. 4, 2002, and is a continuation-in-part of application Ser. No. 10/281,014, filed Oct. 25, 2002 now U.S. Pat. No. 7,136,513.

BACKGROUND OF THE INVENTION

1. Field of the Invention

The present invention relates to checkpoint security, and more particularly to an improved security and identification method and system for improving image quality in a facial recognition system for use in screening and/or identifying individuals passing through secure entry or checkpoints such as airport passenger terminals, government offices, office buildings, military facilities, laboratories, and other secure locations. It will be understood that the system and method disclosed herein can be used in improving image quality in other camera systems as well.

2. Description of the Prior Art

Recent national and international events have underscored the need for effective identification and screening of individuals entering or passing through secure checkpoints. Manual identification of persons at a checkpoint is a slow and cumbersome process, and because it is not precise, manual identification may allow unwanted or undesirable individuals to avoid detection through disguises. As a result, a number of closed-circuit television (CCTV) real-time facial recognition systems have been developed. These systems employ a computer software system that captures video images from a CCTV camera and compares the subject's facial features to those of the many subjects (e.g., terrorists or known felons) already stored in a computer database. In order for a system to function properly, it is important that the system receive a clear video image of the subject's face without heavy shadows or overexposed areas that may hide critical facial features and thereby make it difficult for the system to accurately recognize faces. It is therefore important that each subject passing through a secure checkpoint be briefly stopped and face or be directed to face in a particular direction for an optimal facial read. Because the nature of these systems is such that they may be installed in areas where lighting levels can change significantly (i.e. sunlight vs. clouds, day vs. night lighting, etc.), it is desirable to configure the camera to be less sensitive to external ambient lighting changes. To overcome the limitations of the prior art problems set forth above, such as the problem of assuring that the subject faces in an optimum direction and the problems attendant to variable ambient lighting conditions, the present invention discloses both apparatus and methods to accomplish these purposes.

Existing facial recognition or identification methods include: U.S. Pat. No. 3,805,238, which describes a primitive method for identifying individuals using selected characteristic body curves; U.S. Pat. No. 4,858,000, which describes an image recognition system designed for use in recognizing predetermined individuals out of a viewing audience; U.S. Pat. No. 5,163,094, which describes a method for identifying individuals by the analysis of elemental shapes derived from biosensor data, generating a thermal image of the individual's face that is converted to a digital representation; U.S. Pat. No. 5,905,807, which describes an apparatus for processing a facial image and creating an output of extracted data of feature points that may be used for comparison or other purposes; U.S. Pat. No. 6,111,517, which describes a continuous video monitoring system for regulating access to a restricted environment such as a computer system; and U.S. Pat. No. 6,292,575, which describes a real-time facial recognition and verification system for comparison to a stored image. Each of these patents describes either a method or apparatus for performing facial recognition or identification. However, all of these patents suffer from the drawback that unless the facial image is properly positioned and lighted for a sufficient length of time, the recognition or identification may be incomplete, inaccurate or may not take place at all.

U.S. Pat. No. 6,119,096 describes system using cameras deployed at a turnstile that scan the iris of a user for recognition. The system has sensors which detect the height of the subject, may instruct the subject to wait until scanning is completed before giving an instruction to proceed. U.S. Pat. No. 5,991,429 describes a facial recognition system for overt and covert use in which the camera angle may be adjusted to obtain a better image. However, neither of these patents discloses interactively instructing the subject for proper positioning, nor do they disclose any way to compensate for inadequate lighting.

The invention of U.S. Pat. No. 4,975,969 describes a method and apparatus for identifying individuals and encoding data onto security cards, and a related security system that uses the cards. In order to initialize a security card, the user inserts a blank card into a slot and the user's facial features are recorded in this "picture position" to establish a proper profile. The card reader at a security checkpoint is similarly placed so that the user automatically assumes the picture position at the checkpoint by inserting the card in the reader. If the cameras at the checkpoint do not get a good facial read, the user may be prompted to either reinsert the card or to push a button, causing the user to assume the picture position. It is apparent that this system requires and relies upon properly initialized security cards, and is not suitable for identification of subjects from the general population, such as at an airport check-in. The interactive instructions are only useful in such a pre-identification card-based system, and there is no disclosure of any way to compensate for inadequate lighting.

All of the above-described facial recognition systems suffer from common drawbacks that may prevent a complete or accurate identification/recognition of an individual subject passing through the checkpoint. A quickly moving individual may not remain in the field of view of the camera for a time period of sufficient length to enable proper facial scanning. As a result, an individual who is traveling quickly past the camera may not be recognized. Similarly, an individual may also escape recognition by the above-described system if the individual places a hand, arm, or other object in front of his or her face while passing by the camera. In addition, if there is inadequate ambient lighting in the vicinity of the checkpoint, even a high-resolution low light-sensitive camera may not be able to obtain a sufficiently clear image to perform complete or accurate identification and/or recognition.

Testing by the National Institute of Standards and Technology throughout the years had repeatedly concluded that the most difficult task for facial recognition systems is to match face images under uncontrolled lighting. In the 2002 Face Recognition Vendor Test the performance of the best system had dropped from 95% Verification Rate to 54% for the outdoor (uncontrolled lighting) test condition. Similarly, in the 2005 Face Recognition Grand Challenge the best system's performance decreased from 99% Verification Rate to below 80% for indoor images under uncontrolled lighting. These and other tests clearly showed that ambient lighting has a very significant negative effect on the performance of a face recognition system. Accordingly, there has been a long felt need in the industry for a recognition system that provides improved results under uncontrolled lighting conditions.

SUMMARY OF THE INVENTION

The present invention overcomes the above-described drawbacks by providing an interactive real-time facial recognition system which detects the presence of a subject at the checkpoint, interactively instructs the subject to stop and move into position for proper identification/recognition, analyzes the facial features of the subject as (s)he passes through the checkpoint, and compares the features of the subject with those of known individuals whose features have been placed in a database. In one aspect of the invention, different methods and apparatus are provided for compensating for low ambient light so as to improve the quality of the facial image of the subject that is obtained.

The interactive system of the present invention includes at least one video camera. One or more such cameras may be provided at the security checkpoint, and may be mounted on posts that are associated with each secure entry lane (e.g., a lane of pedestrian traffic exiting a metal detector at an airport). The angle of the camera or cameras may be adjusted in order to obtain the best view of the facial characteristics of individuals passing through the checkpoint. The camera and/or additional cameras may also be deployed in fixtures attached to ceilings, walls, posts or other locations in the near vicinity of the checkpoint to obtain other angles for viewing subjects passing through the checkpoint. While any suitable cameras may be used, advanced, high-resolution, low-light capable digital cameras are preferred.

The present system also includes a position-sensing device that is capable of detecting the presence of an individual within the proximity of the checkpoint and camera(s). Any suitable motion or position sensing device may be employed including without limitation, one or more ultrasonic sensors, one or more laser sensors, one or more optical sensors, a pressure sensitive rug, or the like.

The system of the present invention also includes an interactive mechanism which provides instructions to the individual. This interactive mechanism may be an audio signal (voice, tone or alarm), one or more light signals, illuminated signs containing either words or symbols (e.g. the words "walk"/"don't walk," or the image of a hand/the image of a pedestrian walking), video signals or instructions provided on a video screen, a closable gate, or any combination of these or other similar devices. In particular, when the presence of an individual is sensed by the position sensing device, a signal is transmitted by the interactive mechanism instructing the individual to stop in order to be recognized. In an audio system, for example, a command such as "stop" or "step forward" may be given. In an alternative embodiment, a sign may be illuminated displaying these same words or other words to the same effect, which transmission may or may not be accompanied by a symbol and/or tone. Alternatively, a gate may close, stopping the individual. In each instance, once the presence of the individual is detected, the system interactively instructs the individual to stop moving.

In some cases, it may be necessary for the individual to move closer to the camera, or to look in a certain direction (up, down, right, or left) in order for the camera to properly scan the facial features. In such cases, an appropriate command (e.g. an audible "look up" or "look right") may be given. This same message may also be conveyed using signs, video instructions, or the like, depending upon the particular system used.

Once the subject is stopped and properly positioned, it is possible for the camera(s) to perform a complete and accurate scan of the facial features of the individual in order to then perform the step of comparing those features with the database. Proper positioning of the subject is accomplished using the software in the system that is capable of detecting that there is a face in front of the camera(s). Once the proximity sensor detects the presence of a subject, interactive commands can be given to the subject until the positioning of the subject's face is accomplished. At some point, the software will recognize that there is a face in front of the camera(s), meaning that proper positioning has been accomplished. Then, the camera(s) will generally take a number of pictures (many more than just one) to be used in the comparison process. The steps of scanning and comparing the facial features can be performed in a matter of seconds, after which an appropriate follow up command is given. In most cases, an audio command such as "thank you" or "proceed" may be given. Pictures may continue to be taken until the subject has left the viewing range of the camera(s).

In some cases, the subject may be discharged once an initial set of pictures is taken in order to keep the line of subjects moving, even if the comparison step has not yet been completed. As above, pictures may continue to be taken as the subject leaves. In these cases, if a positive comparison is then made, it will generally occur within moments of the discharge of the subject, which is still in plenty of time to alert the checkpoint attendants to take appropriate action. This slight delay may often prove to be advantageous in that the subject will not be provoked into an unpredictable reaction while in front of the cameras, and may be less guarded as (s)he leaves the area. In addition, by waiting until the subject has moved away from other subjects, (s)he may be more easily separated and detained.

In alternative systems, a green light (with or without a symbol and/or tone), a video instruction on a screen, or a raised gate may be used to convey the discharge message. When a positive comparison is made, and appropriate signal (either a recognition or warning signal, which may or may not be audible) is produced allowing security personnel to quickly respond. For example, when a match occurs, the view station could automatically display the captured, live picture next to the reference picture from the database. In addition, the screen may be programmed to flash an attention-grabbing notice along with an associated text field. The text can be customized with information such as the person's name, nationality, and physical description. The text could also be used to provide appropriate specific response instructions. The system can simultaneously alert security or law enforcement personnel around the facility or around the country so that appropriate response measures may be taken. All activity around the screening area may be recorded and users can quickly access views of the area before, during, and after occurrence of the alarm event. Remote users can also switch to a live view to assess activity in real time.

In most cases, the database will contain images of unwanted individuals, and a recognition will result in an alarm signal of some kind to alert security personnel that an unwanted individual is attempting to pass a secure checkpoint. However, the database may be established such that it contains only images of authorized personnel, in which case a recognition is required in order to pass the checkpoint. In this case, the absence of a recognition will result in an alarm signal.

In an alternative embodiment, a video screen showing the real time view of camera may be provided such that individuals passing the checkpoint are able to view themselves on the screen as they go by. Characters, images or other signals may be displayed on the screen giving instructions for individual to follow (such as "stop," "move forward" and the like, as above). These instructions may replace the video, be overlaid on top of it, or used in conjunction with audio commands.

In one aspect of the invention, a system and method is provided for improved image quality for the facial recognition system in situations where there is poor ambient lighting. A system of the invention is used in connection with an image capturing sub system, a computer sub system and specialized software which performs the face match process. An exemplary image capturing sub system comprises a camera and a light source. An exemplary computer sub system comprises a micro controller as is known in the art. Exemplary software is of the type which performs the functions for facial recognition as further described herein.

A typical installation of the invention may not allow lighting to be distributed around the subject such as is done in a photographer's studio. As such, a more compact light source may be mounted near the camera lens and is configured to fill in large dark areas on the subject's face. However, the light source can also produce specular reflections (glare) from the subject's eyes, eyeglasses, and in some instances, shiny skin. Such glare causes errors in the face match process performed by the specialized software. In one exemplary embodiment this problem is overcome by positioning a polarizing sheet in front of the light source and positioning a corresponding polarizing filter in front of the camera lens and orienting the two relative to one another to block the specular reflections, which are thereby polarized by the polarization sheet and filter arrangement. A normal diffuse image is permitted to pass through the combination of polarized sheet and filter to create a clearer image.

In accordance with the invention, it is also desirable to provide a system which is less sensitive to room ambient lighting and more dependent on auxiliary lighting provided by the system. An exemplary embodiment employs the use of a solid state LED light source as a source of illumination of the subject. Different embodiments may alternatively use strobe, xenon or other suitable pulsed light sources. The light source is pulsed in such a way that it produces very bright illumination for a short period of time and is dimly lit or completely off for the majority of the field cycle time of the camera. Further, the triggering of the light source is synchronized to the opening and closing of the camera's shutter. LEDs are well suited for this application because they are efficient, long lived, and turn on and off much faster than incandescent or fluorescent lamps.

The system of the invention further provides a method of improving the image by synchronizing the shutter opening of the camera with the power line phase. It has been discovered that incandescent and fluorescent lights show brightness variations that are caused by the electrical power driving the lamps. It has been found that if the camera is synchronized with the power line and phased so that the shutter is only open when the room lights are at a minimum brightness point, i.e. the zero voltage level of the 60 Hz power line, the camera will further reject the ambient sources of light which lead to poor image quality. The glare reduction behavior of polarized light can be used in general CCTV applications such as with domes, pan/tilts, and general surveillance cameras, to see through car windows and in similar glare sensitive applications. Other LED colors and other non visible light wavelengths, such as infrared for covert or nighttime viewing can also be used with the above concepts.

The system of the present invention is designed to be installed in security screening areas where individuals are also asked to pass through metal detection equipment under the supervision of security personnel. In one embodiment, the basic system includes a tall, large-diameter post which houses a camera, preferably an advanced, high-resolution, low-light capable digital video camera. In one embodiment, the post is approximately 6 feet high, approximately 10-inches in diameter, and made of heavy gauge, high-grade metal. In addition to housing the camera, the post may also house at least one proximity sensor, as well as visual and/or audio signal indicators (e.g. lights and/or speakers) to control traffic flow past the post. One post is provided for every entry lane, and a single local system having multiple posts may be provided for a multiple-lane checkpoint. Video from the camera of each post is connected to a system processor for analysis and recording, and may also be connected to remote viewing terminals via modem or network connection. Camera angles are carefully controlled, and may be interactively adjusted and optimized to provide the best possible video for analysis and facial recognition.

There is no interconnection between the recognition system of the present invention and any the metal detection or X-ray equipment that may also be deployed at the checkpoint. At an airport, the metal detector lane provides a simple means for confining the subject to a certain space to allow the camera(s) to capture facial images. The system may alternatively be deployed as part of, ahead of, or following the metal detection and X-ray lane. When deployed ahead of the metal detection lane, subjects are stopped, instructed for positioning, and scanned by the system immediately following the showing of their boarding pass and identification to an attendant. This deployment allows the facial scanning process to take place before the subject begins the process of emptying pockets and placing carry-on items on the X-ray conveyor. Such processes tend to distract the subject and may cause the subject to look toward his or her personal belongings instead of the camera.

Placing the system at a location behind the metal detection and X-ray lane provides a second, separate checkpoint where the facial scanning can take place. A separate funneling lane is necessary for this configuration, but this positioning also has the logistical advantage of avoiding the distraction of the subject that may be caused by the process of depositing and retrieving personal items from the X-ray conveyor. It is also advantageous in that if a recognition is made it is easier to separate the recognized subject from other subjects.

In addition to its detection and recognition capability, the present invention also provides full-motion digital video recording for all of the lane cameras, and may record video images from additional cameras deployed in the area. This video is preferably stored on digital hard drives which allow for instant review of any camera at the press of an on-screen button at the view station without interrupting simultaneous recording of images from the checkpoint. User programmable macros allow the system to be set up for quick reviews that are needed often. For example, a press of a button could allow the operator to review the last 30 seconds of activity in front of the screening area. Storage capacity can be scaled to requirements, providing weeks of continuous recording where any segment can be retrieved and viewed in seconds.

The system of the present invention also allows for remote viewing of live or recorded video anywhere over a wide or local area network or modem connection. In accordance with this aspect of the invention, a central dispatch location (or locations) can be automatically notified when an identification is made, and supervisors there can oversee operations at all security checkpoints. In addition, remote users can have access to recorded video. Operations by multiple remote users do not affect each other such that two different users may access the same or different recorded video at the same time without interfering with each other. Access to servers is secured.

All system administration tasks such as photo database management can be centralized. Individual systems may be updated over the network so that data continuity is assured. This could be accomplished over a wide area network under government control, or by local control inside the facility over a local area network. Other system parameters such as recognition sensitivity may also be adjustable from a central location.

It is therefore a primary object of the present invention to provide an automated system including methods and apparatus for improving image quality in facial recognition systems deployed at security checkpoints.

It is also a primary object of the present invention to provide an automated interactive system for detecting, stopping and instructing a subject at a security checkpoint to move into position so that facial identification and recognition may be performed on the subject.

It is also a primary object of the present invention to provide methods and apparatus for overcoming lighting problems encountered in facial identification and recognition systems deployed at security checkpoints having poor ambient lighting.

It is also an important object of the present invention to provide an automated method and apparatus for detecting the presence of a subject at a security checkpoint, interactively instructing the subject to first stop, and then, if necessary, instructing the subject to turn or move in a given direction so that an optimal view of the subject's facial characteristics may be obtained for performing facial identification and recognition on the subject.

It is also an important object of the present invention to provide an automated apparatus for use with a facial identification and recognition system at a security checkpoint to improve image quality that includes a proximity sensor for detecting the presence of a subject in the area of the checkpoint, at least one adjustable camera for obtaining a video image of the subject's facial characteristics, and an interactive system for giving appropriate instructions to the subject such as "stop," "move forward," "look up," and the like.

It is also an important object of the present invention to provide an apparatus for use with a facial identification and recognition system at a security checkpoint to improve image quality that includes at least one camera and one light producing source, a first polarizing filter associated with the light producing source, and a complementary polarizing filter associated with the camera, said filters being used to avoid specular reflections from the eyes, glasses and/or skin of the subject during facial identification and recognition.

It is also an important object of the present invention to provide an apparatus for use with a facial identification and recognition system at a security checkpoint to improve image quality that includes at least one camera and one light producing source in which the light producing source provides a brief pulse of light at given time intervals that coincide with the opening of the shutter of the camera.

It is also an important object of the present invention to provide an apparatus for use with a facial identification and recognition system at a security checkpoint to improve image quality that includes at least one camera that is synchronized with the power line and phased so that the camera shutter is only open when the room lights are at a minimum brightness point so as to reject ambient sources of light that lead to poor image quality.

It is also an important object of the present invention to provide an apparatus for use in connection with a facial identification and recognition system at a security checkpoint that includes at least one tall, large-diameter post at each lane of the checkpoint for housing a proximity sensor, a camera, and interactive signal indicators (lights and/or speakers) for giving instructions to a subject entering the lane.

It is also an important object of the present invention to provide an apparatus for use in connection with a facial identification and recognition system at a security checkpoint that includes a plurality of cameras deployed on walls, ceilings, posts or other structures to provide various angles for facial recognition.

It is also an important object of the present invention to provide an apparatus for use in connection with a facial identification and recognition system at a security checkpoint that is capable of simultaneously recording, displaying and transmitting video from the system to local and remote locations.

In accordance with the present invention there is also provided a method of capturing images of a subject at a checkpoint for recognition of the subject comprising the steps of creating a checkpoint, positioning an image capturing device so that the image capturing device can capture an image of a subject at the checkpoint, filtering the light that enters the image capturing device so that only a predetermined bandwidth enters the image capturing device, positioning a light source so that the light source can illuminate a subject at the checkpoint, providing a light from the light source when the light source is activated that has a bandwidth that is similar to the predetermined bandwidth that enters the image capturing device, capturing a first image of a subject at the checkpoint with the image capturing device with ambient light, activating the light source, capturing a second image of the subject at the checkpoint with the image capturing device while the light source is activated, and determining a difference image by subtracting the second image from the first image.

Additional objects of the invention will be apparent from the detailed descriptions and the claims herein.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF A PREFERRED EMBODIMENT

Figure 1:
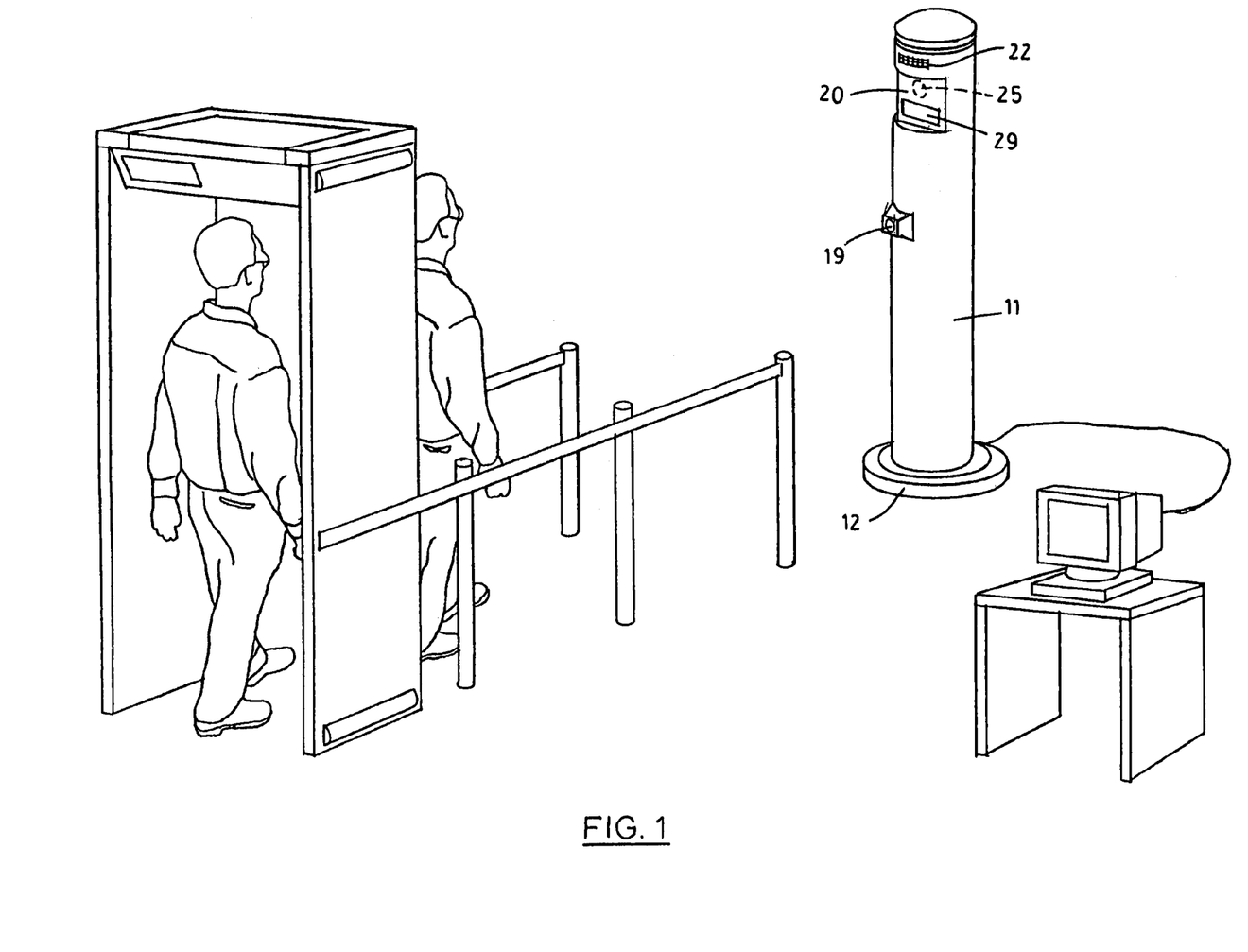
FIG. 1 is an environmental view of the present invention in use in conjunction with an airport metal detector lane.
Figure 2:
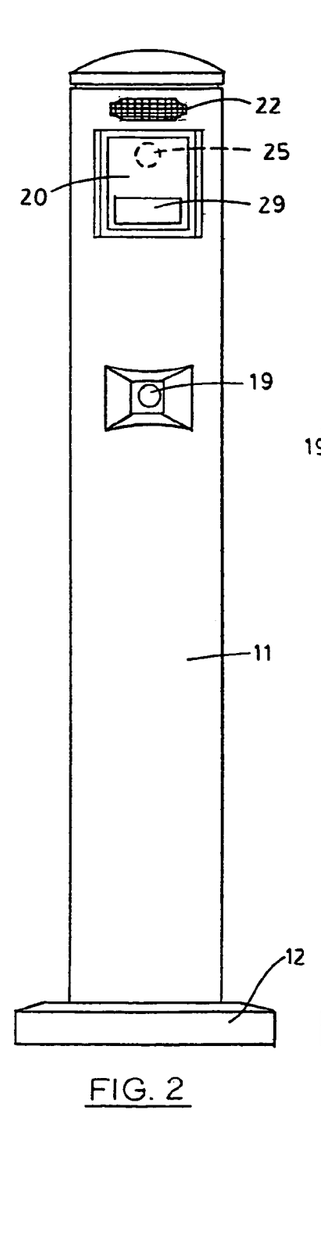
FIG. 2 is a front elevational view of a self-contained unit of the present invention in the form of a vertical post which includes a camera, illuminated signs, audio signal, and ultrasonic proximity sensor.
Figures 3, 4:
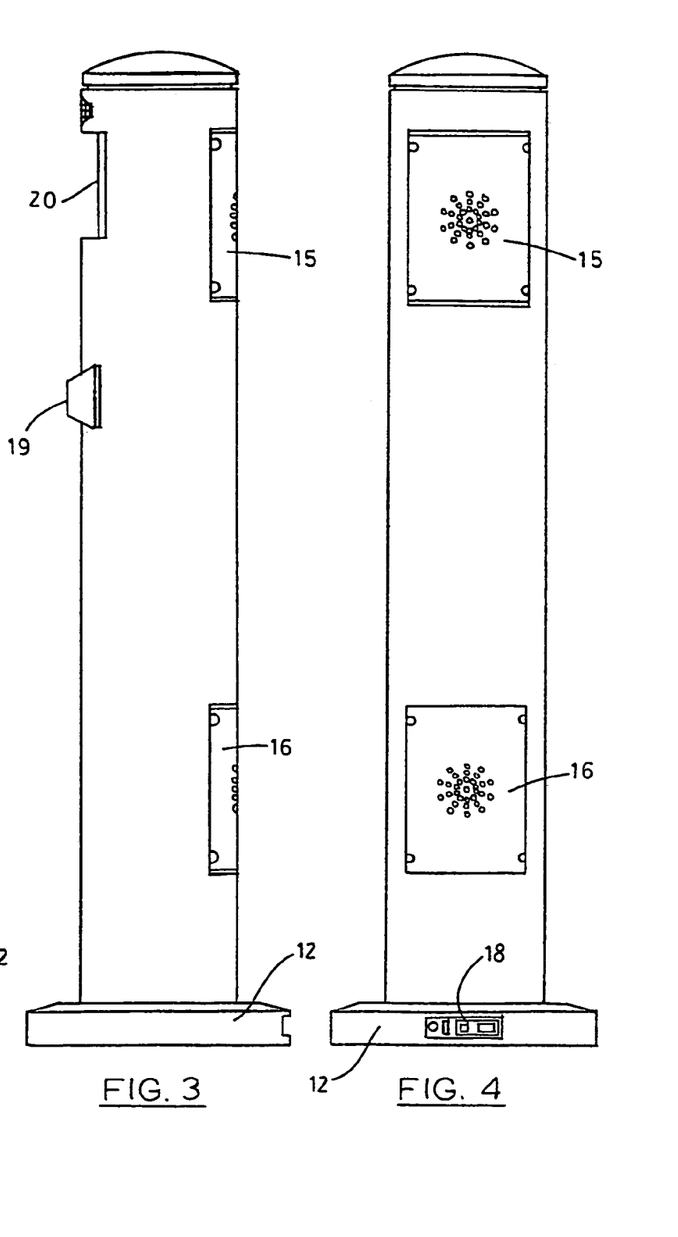
FIG. 3 is a side view of the embodiment of FIG. 2.
FIG. 4 is a back view of the embodiment of FIG. 2.
Figure 5:
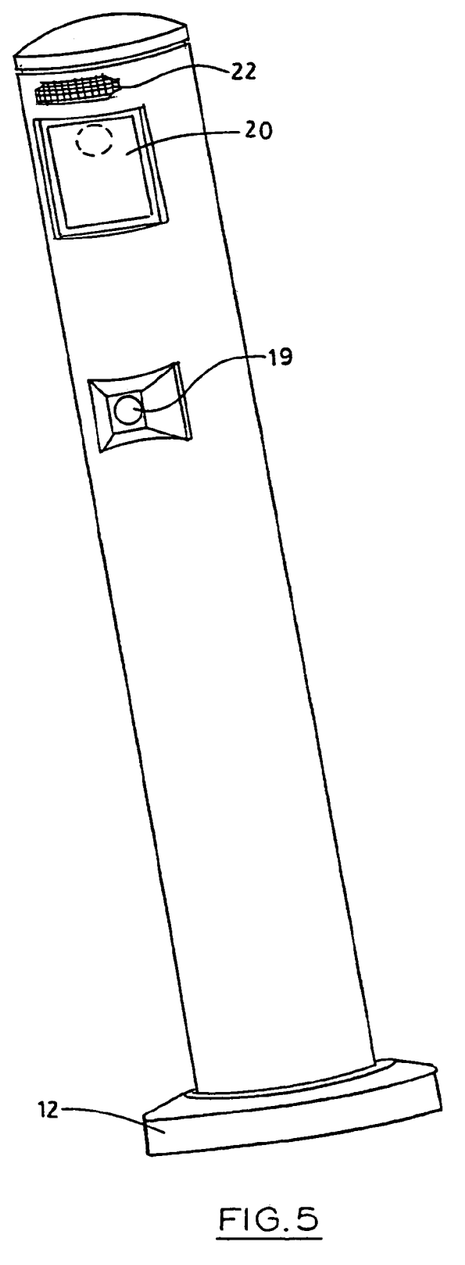
FIG. 5 is a slightly offset perspective front view of the embodiment of FIG. 2.
Figure 6:
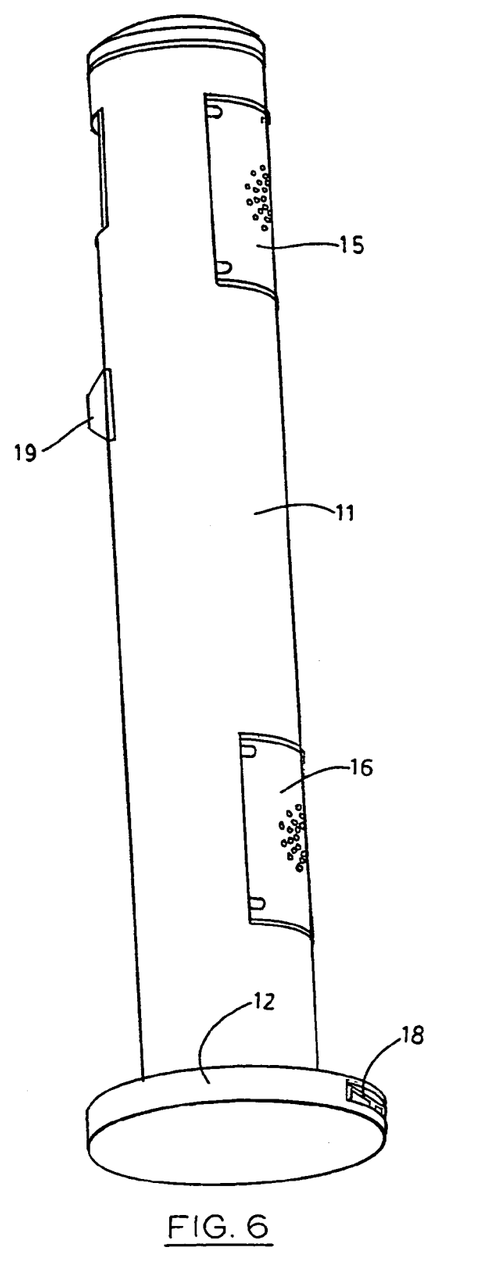
FIG. 6 is another slightly offset perspective rear view of the embodiment of FIG. 2.

Referring to the drawings wherein like reference characters designate like or corresponding parts throughout the several views, and referring particularly to FIGS. 1, 2, and 3, it is seen that the invention includes a large diameter vertical post 11 having a support base 12. A window 20 is provided on the front of post 11 behind which a video camera 25 is deployed, preferably a high-resolution, low-light capable digital camera. Camera 25 should be selected such that is it capable of reading the facial features of individuals from as far away as 25 feet, to as close as 1 foot.

Window 20 also includes at least two illuminatable signs 29 which display the different messages such as "stop" and "go," as well as any other additional or alternative messages such as "look up," "step forward," "step back," "proceed," etc. It is to be appreciated that instead of displaying words in window 20, visual symbols may be used to provide instructions (e.g., the universal "do not enter" symbol of a circle with a single slash "/" across it; the illuminated hand symbol indicating "don't walk" from a pedestrian crosswalk; or any appropriate or newly-developed instructional symbol). At least one audio speaker 21 behind sound holes 22 is provided for giving verbal instructions, tones or warning alarms as the case may be. The audible signals from speaker 21 may be provided in addition to or instead of the visual display at window 20.

A proximity or movement sensor 19 is provided on post 11 below window 20. Sensor 19 may be of any suitable form including ultrasonic, laser, optical, or the like. Alternatively, sensor 19 may be in the form of a pressure sensitive mat in the lane adjacent to post 11. Sensor 19 detects motion in the near proximity of post 11 activating one of the interactive instructional messages such as "stop." Sensor 19 continuously monitors the movements of the individual, and may trigger an alarm if the subject exits the area prematurely, or does not stop after being instructed to do so. Once the proximity of a subject is detected and the subject is stopped, camera 25 communicates the image of the subject to the recognition program. The program is capable of determining whether or not the image it receives is a "face." If this determination is not made, it means that the subject is not facing the camera properly. In response, one or more interactive instructions may be displayed at window 20 and/or audibly given to the subject through speaker 21 such as "step forward," "look up" or "look left." Instructions of this sort may be given until the subject's face is in proper position for scanning. Once the subject is in proper position (a "face" is recognized), one or more video images are taken of the facial characteristics of the subject and provided to the comparison program which performs the identification/recognition function. If the individual is cleared to continue, the window and speakers instruct the individual to "proceed," and sensor 19 continues to monitor the individual's movements until (s)he is out of range.

If the subject is matched to an unwanted or undesirable person in the system database, an appropriate alarm or other signal is generated. This may be in the form of a silent or audible alarm given to the local security operators, and may or may not include additional information. For example, when a match occurs, the view station could automatically display the captured, live picture next to the reference picture from the database. In addition, the screen may be programmed to flash an attention-grabbing notice along with an associated text field. The text can be customized with information such as the person's name, nationality, and physical description. The text could also be used to provide appropriate specific response instructions.

Ventilated access panels 15 and 16 are provided on the rear of post 11 to allow entry to the interior of the post to access the camera 25, change light bulbs, and otherwise maintain and/or repair the electronics inside. A set of jacks 18 for such things as telephone, power, video and/or computer are provided at the rear of base 12.

Figure 7:
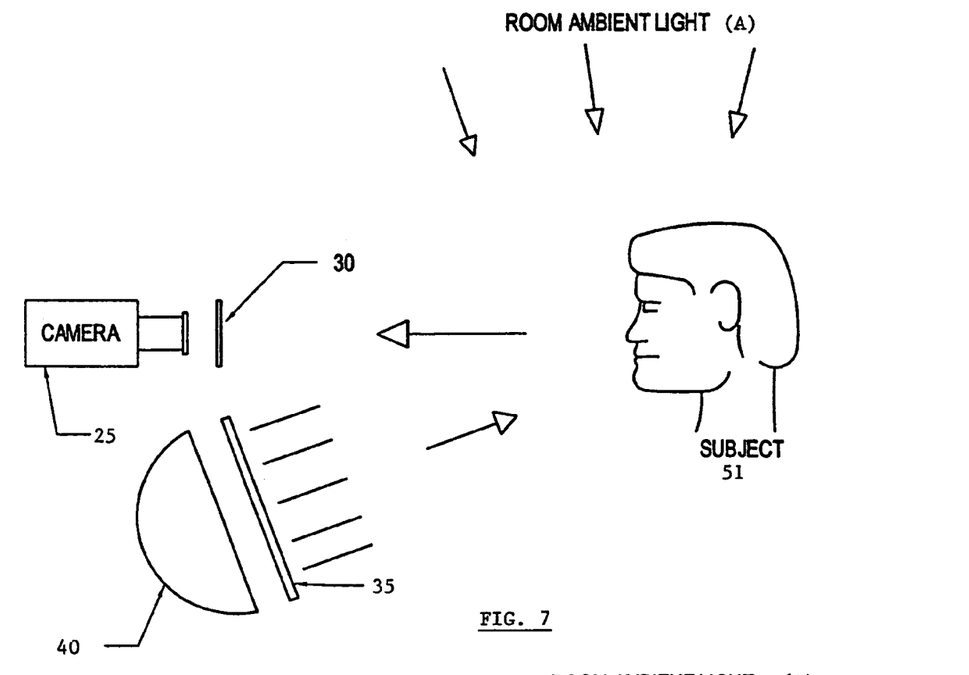
FIG. 7 is a perspective view of a light filtering system constructed in accordance with the principles of the present invention.

Referring now to the alternative embodiment illustrated in FIG. 7, an exemplary system arrangement is shown which supports the features of the present invention. FIG. 7 shows a camera 25 directed toward a subject's face 51. Positioned adjacent the camera 25 is a light source 40. In the exemplary embodiment shown in FIG. 7, a polarizing filter 30 is shown positioned adjacent the camera lens and a polarizing sheet or film 35 is shown positioned adjacent the light source 40. The polarizing filter 30 and the polarizing sheet 35 are positioned relative to one another to limit the amount of specular reflections (eyes, eyeglasses, etc.) from the subject's face. For example, filter 30 may be rotated relative to film 35 to stop glare but allow facial features to pass through.

Figure 8:
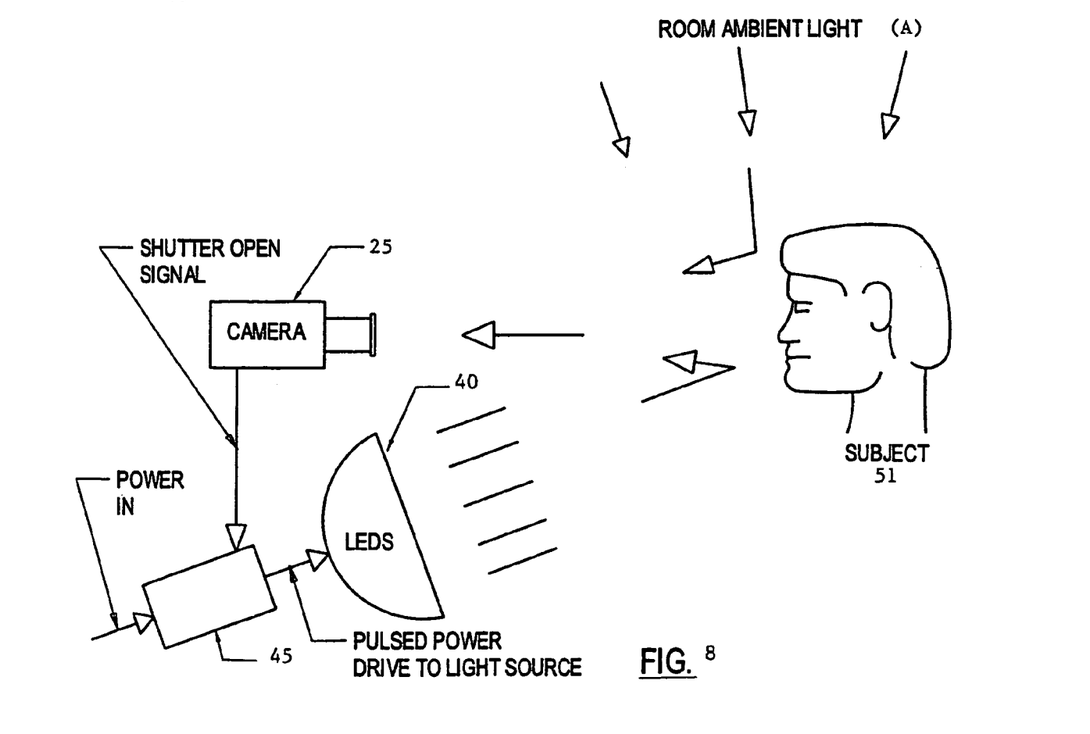
FIG. 8 is a perspective view of an alternate arrangement of a lighting system constructed in accordance with the principles of the present invention.
Figure 9:
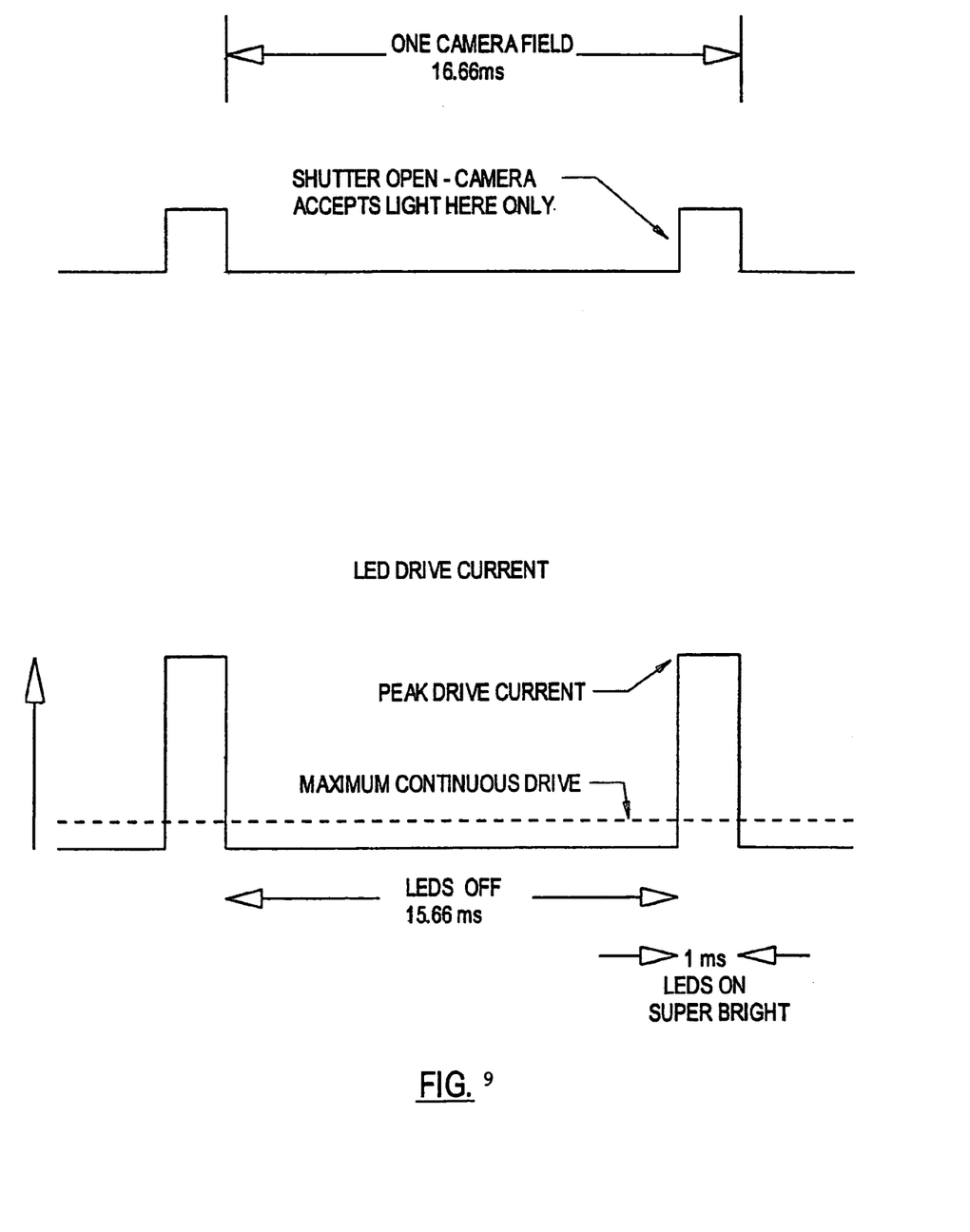
FIG. 9 is a graphic representation of light activation versus shutter opening time.

Turning to FIG. 8, another exemplary arrangement is shown. Provided is the camera 25, the light source 40 and a controller 45. In this embodiment, the light source 40 is at least one light emitting diode (LED), and the controller 45 is configured to pulse the LED light source based on a signal received from the camera 25. To accomplish the synchronization of the activation of the LED light source with the opening of the camera shutter, a signal from the camera indicating the opening of the shutter is detected by the LED controller 45 which activates the LED light source 40 in accordance with desired parameters. An exemplary illumination cycle is shown in FIG. 9, which is a graphic representation of a pulse cycle and shutter opening cycle. The LED light source is illuminated for approximately one millisecond and dimly lit or turned off for approximately 15.7 milliseconds. The camera shutter is synchronized so that it is only open during the time the LED light source is turned on. As such, the camera shutter rejects greater than about 90% of the room ambient light, but accepts virtually 100% of the LED's output.

To provide the desired light levels the LEDs are pulsed with an average drive current close to their maximum continuous rating, shown by the broken lines of FIG. 9. The result is that the drive pulses are many times the peak rating (super bright) during the periods of illumination. However, since the LEDs are only illuminated for short periods of time (e.g. about 1 out of every 16.7 milliseconds), overheating and damage to the LEDs is prevented. By this method, the LED light source 45 is actually many times brighter than the room ambient light A, but appears to be much less bright than room ambient light to the subject's eyes.

Figure 10:
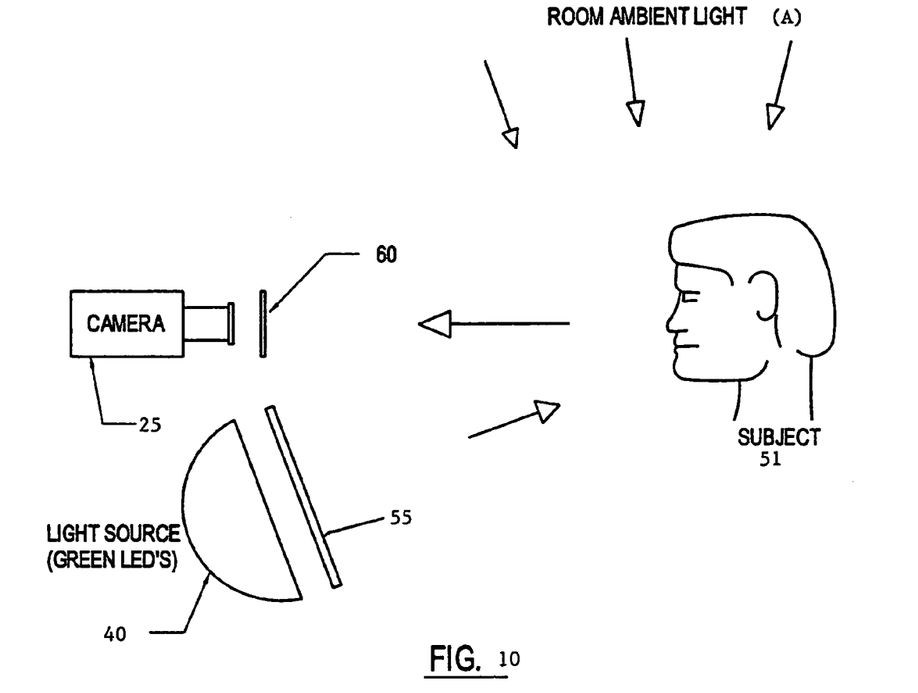
FIG. 10 is a perspective view of another alternate arrangement of a lighting system constructed in accordance with the principles of the present invention.

Yet another exemplary embodiment is shown in FIG. 10. This illustration shows a configuration of a system using green LEDs as the light source 40. A green filter 55 is used to match the LED spectrum, preferably with as narrow band as possible. An associated green filter 60 is provided in front of the camera 25. By this method almost all of the green light passes through the filter and into the camera, and much of the ambient room light A is largely rejected. This is known as spectral filtering and provides a significant improvement over conventional prior art systems. Complementary filters of different colors may alternatively be used for different video effects, the selection of which will depend upon the camera and LEDs used, and the optimal spectrum of light for the given desired performance. Additionally polarization filters may also be employed here, as previously described with reference to FIG. 7.

Figure 11:
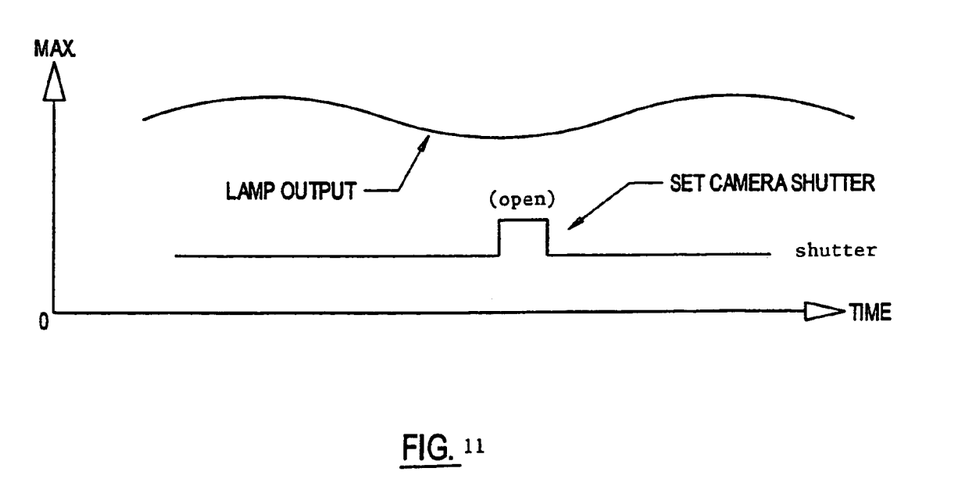
FIG. 11 is a graphic representation of shutter opening time versus power line phase.

It has also been discovered that incandescent and fluorescent lamps encounter brightness variations that are caused by the electrical power driving the lamps. It has been found that the camera will further reject the ambient sources of light A which lead to poor image quality if the camera 25 is synchronized with the power line and phased so that the shutter is only open when the room lights are at a minimum brightness point. An example of this synchronization is illustrated in FIG. 11 where the shutter is synchronized to only open at the minimum brightness point of the corresponding light source (i.e., the zero voltage level of a 60 Hz power line).

It is to be appreciated that numerous different combinations of the various components of the present system may be utilized to accomplish the desired interactive process to stop the individual long enough for facial scanning and comparison to take place. For example, a gate or restraining arm may be used to stop subjects at the checkpoint, or a video display may be used to display the various instructions (e.g., "stop," "move forward," "look left," etc.). It is also to be appreciated that the components of the system need not be included in a single unit or post, but may be disposed together or separately at various locations around the checkpoint, depending upon such things as the configuration of the checkpoint, the closeness of walls and ceilings, the space available, etc.

Embodiments of the present invention are directed to a method and apparatus for a security identification system for recognition of a subject, such as person, for example, the subject's face or iris, or an object, for example, a license plate. All embodiments of this invention use narrow bandwidth near infrared light for illumination and a matching narrow bandpass infrared filter in front of an image capture device. The image capture device can be a camera, and the filter can be located in front of the camera lens, behind the camera lens or elsewhere inside the camera. The infrared light source is turned on and off or pulsed and is synchronized with the shutter speed of the camera by a controller. The ambient lighting is essentially completely canceled out by synchronizing the pulsed infrared light in such a way that two consecutive images are taken: one with the light source on and one without it. The difference of the two images is calculated thereby canceling out the ambient lighting.

In this invention a narrow bandwidth near infrared LED or other light source is employed. In addition, the light source can have its own filter matching the filter associated with the image capture device. What we mean by matching is that the peak frequency and half wave of the light source and filter are approximately the same.

The employed filter on the camera would block out most of all light, including the visible range, with the exception of the narrow infrared bandpass matching the light source's spectrum. The image capture device can be a monochrome camera, which is sensitive in the infrared range and provides a highly improved image.

The difference of the two consecutive images taken by the camera with one image with the light source on and one without the light source is determined. The difference image would only contain reflected light from the camera's own light source with all ambient lighting canceled out. Only the saturation levels need to be taken care of by a camera with wide enough dynamic range.

The algorithmic expression of the ambient light canceling method of the present invention can be summarized in the following three steps:

1. Difference_Image=Ambient+LED_Image−Ambient_Only_Image

2. Ambient_Canceled_Image=Ambient+LED_Image+Difference_Image

3. Final_Ambient_Canceled_Image=SaturationCheck(Ambient_Canceled_Image)

where 'Ambient+LED_Image' and 'Ambient_Only_Image' are two consecutive camera fields, one field with the auxiliary lighting turned on and the other with that lighting turned off respectively. The 'SaturationCheck' function makes sure that the final corrected image is within acceptable boundaries (e.g. if we are dealing with 8 bit images then all values are between 0 and 255) thereby ensuring that the final image is within a predetermined range of saturation. This produces a much-improved result with far more stable image quality.

The difference images can be calculated in hardware or software within the camera before images are sent off for display and further processing. Alternatively, the difference image could be calculated at a later point which would require that both images are transferred from the camera, whereas as previously discussed only the difference image is transmitted form the image capture device.

After the difference image is determined, the recognition and identification procedures are implemented to identify the subject at the checkpoint. The improved image of the subject provides enhanced results in the recognition and identification process.

The range of the filter and light source is just below red, i.e., with a wavelength of approximately 800 nanometers to approximately 1100 nanometers. Preferred ranges producing significantly improved results have been approximately 850 nanometers and approximately 880 nanometers with +/−approximately 20 to 30 nanometer half width. However, it should be recognized that other ranges can also be used.

The image capturing device or camera should have a reasonable width and dynamic linear range since the system is essentially subtracting two large numbers and looking for the small difference. A monochrome camera can be used as the image capturing device.

In an alternate embodiment two different light sources, such as light emitting diodes, at different wavelengths can be used. In this embodiment the two light sources are activated at two different times. A second filter is used with the image capture device when the second light source is activated. This method may enhance some subjects since certain features may be more prominent at certain wavelengths. In addition, to infrared, ultraviolet wavelengths can also be used.

In addition, in another alternative embodiment, the multiple images of the subject are captured with ambient light and with the light source. The difference image can then be determined from multiple images.

For identification, such as facial recognition, it is important that the reference image be taken with a camera that has similar or preferably identical performance specifications as the camera that will be used in the image capturing process at the checkpoint so that the response is similar or preferably identical. This is true for object recognition as well, such as for license plates. In the case of license plates, generally only one license plate needs to be taken as the reference.

It is to be understood that variations and modifications of the present invention may be made without departing from the scope thereof. It is also to be understood that the present invention is not to be limited by the specific embodiments disclosed herein, but only in accordance with the appended claims when read in light of the foregoing specification.

The invention claimed is:

1. A method of capturing images of a subject at a checkpoint for recognition of the subject comprising the steps of:
    creating a checkpoint;
    positioning an image capturing device so that the image capturing device can capture an image of a subject at the checkpoint;
    filtering the light that enters the image capturing device so that only a predetermined bandwidth enters the image capturing device;
    positioning a light source so that the light source can illuminate a subject at the checkpoint;
    providing a light from the light source when the light source is activated that has a bandwidth that is similar to the predetermined bandwidth that enters the image capturing device;
    capturing a first image of a subject at the checkpoint with the image capturing device with ambient light;
    activating the light source;
    capturing a second image of the subject at the checkpoint with the image capturing device while the light source is activated; and
    determining a difference image by subtracting the second image from the first image.

2. A method as recited in claim 1 wherein said filtering step comprises filtering the light that enters the image capturing device so that the light that enters the image capturing device is in the range of approximately 800 nanometers to approximately 1100 nanometers.

3. A method as recited in claim 2 wherein said filtering step comprises filtering the light that enters the image capturing device so that the light that enters the image capturing device is in the range of approximately 820 nanometers to approximately 880 nanometers.

4. A method as recited in claim 3 wherein said filtering step comprises filtering the light that enters the image capturing device so that the light that enters the image capturing device is in the range of approximately 830 nanometers to approximately 870 nanometers.

5. A method as recited in claim 2 wherein said filtering step comprises filtering the light that enters the image capturing device so that the light that enters the image capturing device is in the range of approximately 850 nanometers to approximately 910 nanometers.

6. A method as recited in claim 5 wherein said filtering step comprises filtering the light thai enters the image capturing device so that the light that enters the image capturing device is in the range of approximately 860 nanometers to approximately 900 nanometers.

7. A method as recited in claim 1 further comprising the step of checking the saturation level of the difference image to determine if the difference image is within a predetermined range of saturation.

8. A method as recited in claim 2 further comprising the step of checking the saturation level of the difference image to determine if the difference image is within a predetermined range of saturation.

* * * * *